(12) United States Patent
Kim et al.

(10) Patent No.: US 9,493,648 B2
(45) Date of Patent: Nov. 15, 2016

(54) THERMOPLASTIC RESIN COMPOSITIONS AND MOLDED PRODUCTS INCLUDING THE SAME

(71) Applicant: Cheil Industries Inc., Gumi-si (KR)

(72) Inventors: In-Chol Kim, Uiwang-si (KR); Chang-Min Hong, Uiwang-si (KR); Ja-Yoon Kim, Uiwang-si (KR); Ji-Eun Park, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/136,148

(22) Filed: Dec. 20, 2013

(65) Prior Publication Data

US 2014/0187719 A1    Jul. 3, 2014

(30) Foreign Application Priority Data

Dec. 28, 2012 (KR) .................. 10-2012-0157577
Apr. 4, 2013  (KR) .................. 10-2013-0037003

(51) Int. Cl.
*C08L 69/00* (2006.01)
*C08L 33/10* (2006.01)
*C08L 51/04* (2006.01)

(52) U.S. Cl.
CPC .............. *C08L 69/00* (2013.01); *C08L 33/10* (2013.01); *C08L 51/04* (2013.01)

(58) Field of Classification Search
None
See application file for complete search history.

(56) References Cited

U.S. PATENT DOCUMENTS

| | | |
|---|---|---|
| 4,006,272 A | 2/1977 | Sakaguchi et al. |
| 4,027,073 A | 5/1977 | Clark |
| 4,034,013 A | 7/1977 | Lane |
| 4,045,514 A | 8/1977 | Iwahashi et al. |
| 4,139,600 A | 2/1979 | Rollmann et al. |
| 4,180,494 A | 12/1979 | Fromuth et al. |
| 4,287,315 A | 9/1981 | Meyer et al. |
| 4,303,772 A | 12/1981 | Novicky |
| 4,393,153 A | 7/1983 | Hepp |
| 4,400,333 A | 8/1983 | Neefe |
| 4,694,031 A | 9/1987 | Morita et al. |
| 4,745,029 A | 5/1988 | Kambour |
| 4,788,251 A | 11/1988 | Brown et al. |
| 4,803,235 A | 2/1989 | Okada |
| 4,880,875 A | 11/1989 | Wassmuth et al. |
| 4,906,202 A | 3/1990 | Germ |
| 4,906,696 A | 3/1990 | Fischer et al. |
| 5,025,066 A | 6/1991 | DeRudder et al. |
| 5,061,558 A | 10/1991 | Fischer et al. |
| 5,068,285 A | 11/1991 | Laughner |
| 5,124,402 A | 6/1992 | Laughner et al. |
| 5,189,091 A | 2/1993 | Laughner |
| 5,196,480 A | 3/1993 | Seitz et al. |
| 5,200,492 A | 4/1993 | Ohnaga et al. |
| 5,219,915 A | 6/1993 | McKee et al. |
| 5,280,070 A | 1/1994 | Drzewinski et al. |
| 5,284,916 A | 2/1994 | Drzewinski |
| 5,292,809 A | 3/1994 | Drzewinski et al. |
| 5,308,894 A | 5/1994 | Laughner |
| 5,369,154 A | 11/1994 | Laughner |
| 5,441,997 A | 8/1995 | Walsh et al. |
| 5,449,557 A | 9/1995 | Liebler et al. |
| 5,470,658 A | 11/1995 | Gasca et al. |
| 6,060,538 A | 5/2000 | Gallucci |
| 6,252,002 B1 | 6/2001 | Yamada et al. |
| 6,486,251 B1 | 11/2002 | Patel |
| 6,545,089 B1 | 4/2003 | DeRudder et al. |
| 6,646,068 B2 | 11/2003 | Chisholm et al. |
| 6,653,391 B1 | 11/2003 | Weber et al. |
| 6,835,775 B2 | 12/2004 | Breulmann et al. |
| 7,294,659 B2 | 11/2007 | Yatake |
| 7,345,112 B2 | 3/2008 | You et al. |
| 7,385,013 B2 | 6/2008 | Kobayashi et al. |
| 7,547,736 B2 | 6/2009 | Yang et al. |
| 7,732,515 B2 | 6/2010 | Jang et al. |
| 7,960,464 B2 | 6/2011 | Kobayashi et al. |
| 8,044,143 B2 | 10/2011 | Park et al. |
| 2002/0042483 A1 | 4/2002 | Vanderbilt |
| 2003/0032725 A1 | 2/2003 | Gaggar et al. |
| 2005/0159533 A1 | 7/2005 | Nabeshima et al. |
| 2005/0171297 A1 | 8/2005 | Koevoets et al. |
| 2005/0239949 A1 | 10/2005 | Nakamura et al. |
| 2006/0004154 A1 | 1/2006 | DeRudder et al. |
| 2006/0030647 A1 | 2/2006 | Ebeling et al. |
| 2006/0051587 A1 | 3/2006 | Mori et al. |
| 2006/0100307 A1 | 5/2006 | Uerz et al. |
| 2006/0135690 A1 | 6/2006 | Juikar et al. |

(Continued)

FOREIGN PATENT DOCUMENTS

| | | |
|---|---|---|
| CN | 1285858 A | 2/2001 |
| DE | 19845317 A1 | 4/2000 |

(Continued)

OTHER PUBLICATIONS

Kwon et al., electronic translation of KR 10-2008124708, Jun. 2010.*
Kang, et al., "PC/ASA blends having enhanced interfacial and mechanical properties," Korea-Australia Rheology Journal, vol. 18, No. 1, Mar. 2006 pp. 1-8.
Taiwanese Office Action in commonly owned Taiwanese Application No. 96136059 issued on May 5, 2011, pp. 1-9.
English Translation of Taiwanese Office Action in commonly owned Taiwanese Application No. 96136059 issued on May 5, 2011, pp. 1-5.
European Search Report in commonly owned European Application No. 07808474 dated Sep. 28, 2011, pp. 1-4.

(Continued)

*Primary Examiner* — Jeffrey Mullis
(74) *Attorney, Agent, or Firm* — Additon, Higgins & Pendleton, P.A.

(57) ABSTRACT

Disclosed is a thermoplastic resin composition including: (A) a polycarbonate resin; (B) an acrylate-styrene-acrylonitrile (ASA) graft copolymer; (C) a random copolymer of an alkyl(meth)acrylate, an aromatic vinyl compound, and a vinyl cyanide compound; and (D) a copolymer of an aromatic methacrylate and a monofunctional unsaturated monomer.

8 Claims, No Drawings

(56) References Cited

U.S. PATENT DOCUMENTS

| | | | |
|---|---|---|---|
| 2007/0265371 A1 | 11/2007 | Takahashi et al. | |
| 2008/0009571 A1 | 1/2008 | Pixton et al. | |
| 2008/0153954 A1 | 6/2008 | Arpin | |
| 2008/0242789 A1 | 10/2008 | Zhu et al. | |
| 2009/0012222 A1 | 1/2009 | Duijzings et al. | |
| 2009/0080079 A1 | 3/2009 | Kogure et al. | |
| 2009/0118402 A1 | 5/2009 | Jang et al. | |
| 2009/0209696 A1 | 8/2009 | Lee et al. | |
| 2009/0275678 A1 | 11/2009 | Kumazawa et al. | |
| 2010/0010172 A1 | 1/2010 | Hong et al. | |
| 2010/0029855 A1 | 2/2010 | Matsuoka et al. | |
| 2010/0113648 A1 | 5/2010 | Niessner et al. | |
| 2010/0152357 A1 | 6/2010 | Kwon et al. | |
| 2010/0160529 A1 | 6/2010 | Lee et al. | |
| 2010/0160532 A1 | 6/2010 | Park et al. | |
| 2010/0168272 A1 | 7/2010 | Park et al. | |
| 2010/0197827 A1 | 8/2010 | Kim et al. | |
| 2010/0240831 A1 | 9/2010 | Kim et al. | |
| 2010/0256288 A1 | 10/2010 | Kim et al. | |
| 2011/0009524 A1 | 1/2011 | Kwon et al. | |
| 2011/0021677 A1 | 1/2011 | Kwon et al. | |
| 2011/0040019 A1 | 2/2011 | Kwon et al. | |
| 2011/0160380 A1 | 6/2011 | Kwon et al. | |
| 2012/0065318 A1* | 3/2012 | Park et al. | 524/508 |
| 2012/0129989 A1 | 5/2012 | Kim et al. | |
| 2013/0131258 A1 | 5/2013 | Kwon et al. | |

FOREIGN PATENT DOCUMENTS

| | | |
|---|---|---|
| DE | 69829099 T2 | 12/2005 |
| EP | 0033393 A2 | 8/1981 |
| EP | 0114288 A2 | 8/1984 |
| EP | 0180417 A2 | 5/1986 |
| EP | 0246620 A2 | 5/1987 |
| EP | 0376616 A2 | 7/1990 |
| EP | 0528462 A1 | 2/1993 |
| EP | 0755977 A2 | 1/1997 |
| EP | 0787769 A2 | 8/1997 |
| EP | 1010725 A2 | 6/2000 |
| EP | 2204412 A1 | 7/2010 |
| JP | 53-134799 A | 11/1978 |
| JP | 57-125241 A | 8/1982 |
| JP | 58-196250 A | 11/1983 |
| JP | 62-268612 A | 11/1987 |
| JP | 04-023856 A | 1/1992 |
| JP | 04-359954 A | 12/1992 |
| JP | 05-098136 A | 4/1993 |
| JP | 05-125260 A | 5/1993 |
| JP | 05-194829 | 8/1993 |
| JP | 06-122771 A | 5/1994 |
| JP | 06-136212 A | 5/1994 |
| JP | 06-313089 A | 11/1994 |
| JP | 07-026101 | 1/1995 |
| JP | 10-060241 A | 3/1998 |
| JP | 10-060242 A | 3/1998 |
| JP | 10-219026 A | 8/1998 |
| JP | 10-226748 | 8/1998 |
| JP | 11-129246 A | 5/1999 |
| JP | 11-181168 A | 7/1999 |
| JP | 11-279385 | 10/1999 |
| JP | 2000-212293 A | 8/2000 |
| JP | 2000-265001 A | 9/2000 |
| JP | 2000-327992 | 11/2000 |
| JP | 2001-049072 A | 2/2001 |
| JP | 2002-080676 A | 3/2002 |
| JP | 2003-525335 | 8/2003 |
| JP | 2003-313392 | 11/2003 |
| JP | 2005-220173 A | 8/2005 |
| JP | 2006-249292 A | 9/2006 |
| JP | 2006-257284 A | 9/2006 |
| JP | 2006-342246 A | 12/2006 |
| JP | 2007-077222 | 3/2007 |
| JP | 2008-013702 A | 1/2008 |
| KR | 10-1996-0001023 | 1/1996 |
| KR | 10-1996-0001025 | 1/1996 |
| KR | 1996-0007611 B1 | 6/1996 |
| KR | 10-1998-0004915 | 6/1998 |
| KR | 10-1998-027070 | 7/1998 |
| KR | 1998-055579 | 9/1998 |
| KR | 10-1999-0018287 | 3/1999 |
| KR | 10-0201985 | 3/1999 |
| KR | 10-1999-0029495 A | 4/1999 |
| KR | 10-1999-0054644 | 7/1999 |
| KR | 10-2000-0038719 A | 7/2000 |
| KR | 10-2000-0048033 A | 7/2000 |
| KR | 10-2001-0032100 A | 4/2001 |
| KR | 10-2001-0070975 A | 7/2001 |
| KR | 10-2003-0034796 A | 5/2003 |
| KR | 10-0384377 B1 | 11/2003 |
| KR | 2004-0079118 A | 9/2004 |
| KR | 10-0454799 | 1/2005 |
| KR | 10-2005-0032100 A | 4/2005 |
| KR | 10-0514272 B | 9/2005 |
| KR | 10-2005-0109049 A | 11/2005 |
| KR | 10-2006-0035002 A | 4/2006 |
| KR | 10-0581437 B | 5/2006 |
| KR | 10-0696329 B1 | 3/2007 |
| KR | 10-0709878 B1 | 4/2007 |
| KR | 10-2007-0070686 A | 7/2007 |
| KR | 10-2007-0072372 A | 7/2007 |
| KR | 10-0767428 A1 | 10/2007 |
| KR | 10-2008-0062975 A | 7/2008 |
| KR | 10-2008-0063054 A | 7/2008 |
| KR | 10-2008-0090459 A | 10/2008 |
| KR | 10-0871436 B1 | 11/2008 |
| KR | 10-2009-0020642 A | 2/2009 |
| KR | 10-2009-0030511 A | 3/2009 |
| KR | 10-0886348 B1 | 3/2009 |
| KR | 10-2009-0038507 A | 4/2009 |
| KR | 10-2010-0045830 A | 5/2010 |
| KR | 10-2008-124708 * | 6/2010 |
| KR | 10-2010-0071715 | 6/2010 |
| KR | 10-0988999 B1 | 10/2010 |
| KR | 10-2011-0079488 A | 7/2011 |
| KR | 10-2012-0029156 A | 3/2012 |
| KR | 10-2012-0031532 A | 4/2012 |
| KR | 10-1143239 B1 | 5/2012 |
| KR | 10-2011-0077805 A | 5/2013 |
| WO | 02/088044 A1 | 11/2002 |
| WO | 2005/075554 A1 | 8/2005 |
| WO | 2007/119920 A1 | 10/2007 |
| WO | 2007/140101 A1 | 12/2007 |
| WO | 2008/039017 A1 | 4/2008 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |
| WO | 2011/013882 A1 | 2/2011 |

OTHER PUBLICATIONS

International Preliminary Report on Patentability in commonly owned International Application No. PCT/KR2007/004743, dated Mar. 31, 2009, pp. 1-5.

International Search Report in commonly owned International Application No. PCT/KR2007/004743, dated Jan. 4, 2008, pp. 1-2.

Office Action in commonly owned U.S. Appl. No. 12/413,630 mailed Jun. 23, 2009, pp. 1-9.

Final Office Action in commonly owned U.S. Appl. No. 12/413,630 mailed Dec. 7, 2009, pp. 1-9.

Advisory Action in commonly owned U.S. Appl. No. 12/413,630 mailed Apr. 9, 2010, pp. 1-3.

French Search Report and Written Opinion in commonly owned French Application No. 0959193 dated May 27, 2010, pp. 1-5.

Office Action in commonly owned U.S. Appl. No. 12/640,343 mailed Aug. 29, 2011, pp. 1-7.

Office Action in commonly owned U.S. Appl. No. 12/640,343 mailed Feb. 22, 2012, pp. 1-13.

Final Office Action in commonly owned U.S. Appl. No. 12/640,343 mailed Jun. 5, 2012, pp. 1-12.

(56) References Cited

OTHER PUBLICATIONS

Office Action in commonly owned U.S. Appl. No. 12/641,752 mailed Jan. 10, 2011, pp. 1-10.
Notice of Allowance in commonly owned U.S. Appl. No. 12/641,752 mailed Jul. 20, 2011, pp. 1-9.
International Search Report in commonly owned International Application No. PCT/KR2009/007917 dated Aug. 24, 2010, pp. 1-9.
English-translation of Abstract for Korean Publication No. 1998-055579, published Sep. 25, 1998, pp. 1.
Igranox 1076, SpecialChem, Ciba, now part of BASF, 2012 Retrieved online<http://www.specialchem4adhesives.com>, pp. 1.
Office Action in commonly owned U.S. Appl. No. 13/362,068 mailed Apr. 6, 2012, pp. 1-24.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
European Search Report in commonly owned European Application No. 08873425.6 dated May 29, 2012, pp. 1-5.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/792,176 mailed Apr. 19, 2012, pp. 1-10.
Chinese Search Report in commonly owned Chinese Application No. 200980159831.0 dated Dec. 17, 2012, pp. 1-2.
International Search Report in commonly owned International Application No. PCT/KR2009/007944 dated Aug. 13, 2010, pp. 1-6.
Full English Translation of JP 04-359953.
Full English Translation of JP 04-359954.

* cited by examiner

THERMOPLASTIC RESIN COMPOSITIONS AND MOLDED PRODUCTS INCLUDING THE SAME

CROSS-REFERENCE TO RELATED APPLICATION

This application claims priority to and the benefit of Korean Patent Application No. 10-2012-0157577, filed in the Korean Intellectual Property Office on Dec. 28, 2012, and Korean Patent Application No. 10-2013-0037003, filed in the Korean Intellectual Property Office on Apr. 4, 2013, the entire disclosure of each of which is incorporated herein by reference.

FIELD OF THE INVENTION

Thermoplastic resin compositions and articles including the same are disclosed.

BACKGROUND OF THE INVENTION

Acrylate-styrene-acrylonitrile (ASA) resins have excellent weatherability and thus are widely used in building materials, exterior part materials for vehicles, and the like. However, the ASA resins can have poor impact resistance. To improve impact resistance, ASA resins are often used in the form of a composition including a rubber polymer. In such a case, the ASA resin compositions require a large amount of the rubber polymer in order to be applicable for uses requiring a high level of impact strength. Such a large amount of the rubber polymer, however, may result in poor heat resistance, which can limit their use in applications requiring a high level of heat resistance such as exterior part materials for vehicles.

In an attempt to provide an alternative, a method of enhancing heat resistance and impact resistance by alloying the ASA resin with a polycarbonate (PC) resin that has excellent heat resistance has been proposed. The PC/ASA resin is often used for a radiator grill for vehicles. However, unlike the PC resin having a high refractive index, the ASA resin has a relatively low level of refractive index. Thus, when the ASA resin is combined with the PC resin, the resulting resin composition may provide a molded product having poor coloring properties, which can limit its use in various products.

SUMMARY OF THE INVENTION

One embodiment provides a thermoplastic resin composition that can exhibit enhanced coloring properties of PC/ASA resins. Another embodiment provides a molded product including the resin composition.

According to one embodiment, a thermoplastic resin composition includes: (A) a polycarbonate resin; (B) an acrylate-styrene-acrylonitrile (ASA) graft copolymer; (C) a random copolymer of an alkyl(meth)acrylate, an aromatic vinyl compound, and a vinyl cyanide compound; and (D) a copolymer of an aromatic methacrylate and a monofunctional unsaturated monomer.

The thermoplastic resin composition may include (A) about 40 to about 70% by weight of a polycarbonate resin; (B) about 20 to about 40% by weight of an acrylate-styrene-acrylonitrile (ASA) graft copolymer; (C) about 9 to about 29% by weight of a random copolymer of an alkyl(meth)acrylate, an aromatic vinyl compound, and a vinyl cyanide compound; and (D) greater than or equal to about 0.1% by weight and less than about 10% by weight of a copolymer of an aromatic methacrylate and a monofunctional unsaturated monomer. In the thermoplastic resin composition, the sum of the amounts of the random copolymer (C) of an alkyl(meth)acrylate, an aromatic vinyl compound, and a vinyl cyanide compound and the copolymer (D) of an aromatic methacrylate and a monofunctional unsaturated monomer is less than about 30% by weight based on the total weight of the composition.

In the thermoplastic resin composition, the amount of the alkyl(meth)acrylate compound in the random copolymer (C) of an alkyl(meth)acrylate, an aromatic vinyl compound, and a vinyl cyanide compound may range from about 50% by weight to about 89% by weight based on the total weight of the random copolymer (C) of an alkyl(meth)acrylate, an aromatic vinyl compound, and a vinyl cyanide compound.

In the random copolymer (C) of an alkyl(meth)acrylate, an aromatic vinyl compound, and a vinyl cyanide compound, the alkyl(meth)acrylate compound may include methyl acrylate, ethyl acrylate, methyl methacrylate, and/or ethyl methacrylate, the aromatic vinyl compound may include styrene, α-methylstyrene, and/or p-methylstyrene, and the vinyl cyanide compound may include acrylonitrile and/or methacrylonitrile.

The copolymer (D) of an aromatic vinyl compound and a monofunctional unsaturated monomer may include a copolymer of an aromatic methacrylate represented by Chemical Formula 1 and a monofunctional unsaturated monomer or a mixture thereof:

[Chemical Formula 1]

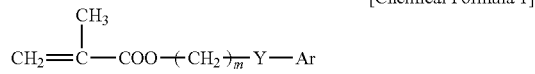

wherein m is an integer of 0 to 10, Y is a single bond, —O—, or —S—, and Ar is phenyl, methyl phenyl, methyl ethyl phenyl, propyl phenyl, methoxy phenyl, cyclohexyl phenyl, chloro phenyl, bromo phenyl, phenyl phenyl, or benzyl phenyl.

In the thermoplastic resin composition, the monofunctional unsaturated monomer in the copolymer (D) of an aromatic vinyl compound and a monofunctional unsaturated monomer can include a (meth)acrylic acid ester, an unsaturated carboxylic acid, an acid anhydride, an ester containing a hydroxyl group, and/or a (meth)acrylamide.

In the thermoplastic resin composition, the copolymer (D) of an aromatic vinyl compound and a monofunctional unsaturated monomer can have a weight average molecular weight of about 3,000 g/mol to about 30,000 g/mol.

In another embodiment, a molded product including the thermoplastic resin composition is provided.

The PC/ASA resin composition includes a random copolymer of an alkyl(meth)acrylate, an aromatic vinyl compound, and a vinyl cyanide compound, and a copolymer of an aromatic methacrylate and a monofunctional unsaturated monomer. A molded product preparing using the same can have enhanced coloring properties.

DETAILED DESCRIPTION OF THE INVENTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "(meth)acrylate" refers to an acrylate and/or methacrylate, the term "(meth)acrylic acid" refers to acrylic acid and/or methacrylic acid, and the term "(meth)acrylamide" refers to acrylamide and/or methacrylamide. As used herein, when a specific definition is not otherwise provided, the term "alkyl" refers to C1 to C30 alkyl, for example, C1 to C20 alkyl.

As used herein, when a specific definition is not otherwise provided, the term "copolymerization" refers to block copolymerization, random copolymerization, graft copolymerization, and/or alternating copolymerization, and the term "copolymer" refers to a block copolymer, a random copolymer, a graft copolymer, and/or an alternating copolymer.

A thermoplastic resin composition according to one embodiment includes: (A) a polycarbonate resin; (B) an acrylate-styrene-acrylonitrile (ASA) graft copolymer; (C) a random copolymer of an alkyl(meth)acrylate, an aromatic vinyl compound, and a vinyl cyanide compound; and (D) a copolymer of an aromatic methacrylate and a monofunctional unsaturated monomer.

(A) Polycarbonate (PC) resin

In the thermoplastic resin composition, the polycarbonate is a polyester having a carbonate bond. The type of polycarbonate is not particularly limited and any polycarbonate available in the field of resin compositions may be used.

For example, the polycarbonate resin may be prepared by reacting a diphenol with a compound selected from the group consisting of phosgene, a halogen formate, a carbonate ester, and combinations thereof. Examples of the diphenols may include, but are not limited to, hydroquinone, resorcinol, 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof.

The polycarbonate resin may have a weight average molecular weight (Mw) of about 5,000 g/mol to about 200,000 g/mol, for example about 5,000 g/mol to about 40,000 g/mol, for mechanical properties and moldability.

The polycarbonate resin may be a copolymer or mixture of copolymers prepared from two or more diphenols. The polycarbonate resin may also include a linear polycarbonate resin, a branched polycarbonate resin, a polyester carbonate copolymer, and the like, or a combination thereof.

The linear polycarbonate resin may include a bisphenol-A based polycarbonate resin. The branched polycarbonate resin may include one produced by reacting a multi-functional aromatic compound such as trimellitic anhydride, trimellitic acid, and the like with one or more diphenols and a carbonate. A repeating unit derived from the multi-functional aromatic compound may be included in an amount of about 0.05 to about 2 mol % based on the total weight of repeating units of the polycarbonate resin. The polyester carbonate copolymer resin may include one produced by reacting a difunctional carboxylic acid with one or more diphenols and a carbonate. The carbonate may include a diaryl carbonate such as diphenyl carbonate and ethylene carbonate.

The thermoplastic resin composition may include the polycarbonate resin (A) in an amount of about 40 wt % to about 70 wt %, for example about 50 wt % to about 60 wt %, based on the total weight of the thermoplastic resin composition. In some embodiments, the thermoplastic resin composition may include the polycarbonate resin in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70wt %. Further, according to some embodiments of the present invention, the amount of the polycarbonate resin can be in a range from about any of the foregoing amounts to about any other of the foregoing amounts.

(B) Graft Copolymer of Acrylate-Styrene-Acrylonitrile (ASA)

The graft copolymer of acrylate-styrene-acrylonitrile (ASA) is a core-shell type copolymer prepared by graft-polymerizing an acrylate rubber copolymer with a styrene monomer and an acrylonitrile monomer. The types of the ASA graft copolymers used in the thermoplastic resin composition are not particularly limited and may be properly chosen as necessary without undue experimentation by the skilled artisan.

The ASA graft copolymer may be prepared by any methods known in the art. By way of a non-limiting example, an acrylate rubber polymer can be prepared, and a styrene monomer and an acrylonitrile monomer can be graft-copolymerized to form at least one layer of a shell on the core including at least one layer of the acrylate rubber polymer being formed thereon.

The acrylate rubber polymer may be prepared using an acrylate monomer as a main monomer. Examples of the acrylate monomer may include without limitation ethyl acrylate, butyl acrylate, 2-ethylhexyl acrylate, hexyl acrylate, and the like, and combinations thereof. The acrylate monomer may be copolymerized with at least one other monomer that may undergo radical polymerization. In the copolymerization, the other monomer that may undergo radical polymerization can be used in an amount of about 5 to about 30 wt %, for example about 10 to about 20 wt %, based on the total weight of the acrylate rubber polymer.

Examples of the styrene monomer included in the shell may include without limitation styrene, α-methylstyrene, p-methylstyrene, and the like, and combinations thereof.

Examples of the acrylonitrile monomer may include without limitation acrylonitrile, methacrylonitrile, and the like, and combinations thereof.

In a non-limiting example, the ASA graft copolymer may be a double core-shell type ASA graft copolymer produced by preparing a butyl acrylate rubber copolymer having a double core structure including an inner core of a copolymer of butyl acrylate and styrene and an outer core of a butyl acrylate polymer, and conducting graft polymerization of an acrylonitrile monomer and a styrene monomer onto the butyl acrylate rubber copolymer of the double core structure via emulsion polymerization.

The ASA graft copolymer may include the acrylate rubber polymer in an amount of about 30 to about 70 parts by weight, for example about 40 to about 60 parts by weight, based on about 100 parts by weight of the ASA graft copolymer. In some embodiments, the ASA graft copolymer may include the acrylate rubber polymer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 parts by weight. Further, according to some embodiments of the present invention, the amount of the acrylate rubber polymer can be in a range from about any of the foregoing amounts to about any other of the foregoing amounts.

The ASA graft copolymer may include the styrene monomer and the acrylonitrile monomer in an amount of about 30 to about 70 parts by weight, for example about 40 to about 60 parts by weight, based on about 100 parts by weight of the ASA graft copolymer. In some embodiments, the ASA graft copolymer may include the styrene monomer and the acrylonitrile monomer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 parts by weight. Further, according to some embodiments of the present invention, the amount of the styrene monomer and the acrylonitrile monomer can be in a range from about any of the foregoing amounts to about any other of the foregoing amounts.

The shell may include the styrene monomer in an amount of about 50 to about 80% by weight, for example about 60 to about 70% by weight, based on the total weight of the shell. In some embodiments, the shell may include the styrene monomer in an amount of 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the styrene monomer can be in a range from about any of the foregoing amounts to about any other of the foregoing amounts.

The shell may include the acrylonitrile monomer in an amount of about 20 to about 50% by weight, for example, about 30 to about 40% by weight, based on the total weight of the shell. In some embodiments, the shell may include the acrylonitrile monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the acrylonitrile monomer can be in a range from about any of the foregoing amounts to about any other of the foregoing amounts.

The thermoplastic resin composition may include the ASA graft copolymer in an amount of about 20 to about 40% by weight, for example about 20 to about 30% by weight, based on the total weight of the resin composition. In some embodiments, the thermoplastic resin composition may include the ASA graft copolymer in an amount of about 20, 21, 22, 23, 24, 25, 26, 27, 28, 29, 30, 31, 32, 33, 34, 35, 36, 37, 38, 39, or 40% by weight. Further, according to some embodiments of the present invention, the amount of the the ASA graft copolymer can be in a range from about any of the foregoing amounts to about any other of the foregoing amounts.

(C) Random Copolymer Including an Alkyl(Meth)Acrylate Compound, an Aromatic Vinyl Compound, and a Vinyl Cyanide Compound The thermoplastic resin composition includes a random copolymer including an alkyl(meth)acrylate compound, an aromatic vinyl compound, and a vinyl cyanide compound.

Examples of the alkyl(meth)acrylate compound may include without limitation methyl acrylate, ethyl acrylate, methyl methacrylate, ethyl methacrylate, and the like, and combinations thereof.

Examples of the aromatic vinyl compound may include without limitation styrene, C1 to C4 alkyl substituted styrene such as α-methylstyrene, halogen substituted styrene, and the like, and combinations thereof.

Examples of the vinyl cyanide compound may include without limitation acrylonitrile, methacrylonitrile, and the like, and combinations thereof.

The random copolymer may include the alkyl(meth)acrylate compound in an amount of about 50 to about 89% by weight, for example about 60 to about 80% by weight, based on the total weight of the random copolymer (C). In some embodiments, the random copolymer may include the alkyl(meth)acrylate compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89% by weight. Further, according to some embodiments of the present invention, the amount of the alkyl(meth)acrylate compound can be in a range from about any of the foregoing amounts to about any other of the foregoing amounts.

When the amount of the alkyl(meth)acrylate compound is within the above range, the thermoplastic resin composition including the random copolymer (C) may have significantly enhanced coloring properties and improved weatherability without having a negative influence on other properties of the resin such as heat resistance, flowability, and the like.

The random copolymer may include the aromatic vinyl compound in an amount of about 10 to about 30% by weight, based on the total weight of the random copolymer (C). In some embodiments, the random copolymer may include the aromatic vinyl compound in an amount of about 10, 11, 12, 13, 14, 15, 16, 17, 18, 19, 20, 21, 22, 23, 24, 25, 26, 27, 28, 29, or 30% by weight. Further, according to some embodiments of the present invention, the amount of the aromatic vinyl compound can be in a range from about any of the foregoing amounts to about any other of the foregoing amounts.

The random copolymer may include the vinyl cyanide compound in an amount of about 1 to about 20% by weight, based on the total weight of the random copolymer (C). In some embodiments, the random copolymer may include the vinyl cyanide compound in an amount of about 1, 2, 3, 4, 5, 6, 7, 8, 9, 10, 11, 12, 13, 14, 15, 16, 17, 18, 19, or 20% by weight. Further, according to some embodiments of the present invention, the amount of the vinyl cyanide compound can be in a range from about any of the foregoing amounts to about any other of the foregoing amounts.

The random copolymer (C) may have a weight average molecular weight of about 10,000 to about 200,000 g/mol, for example, about 50,000 to about 150,000 g/mol.

Without wishing to be bound any theory of the invention, the random copolymer (C) is currently believed to enhance the coloring properties of the molded product prepared from the resin composition based on the following reasons. When a resin composition including the polycarbonate resin and the ASA graft copolymer is melt-kneaded and extruded, domains of the ASA graft copolymer are dispersed in the polycarbonate matrix. The random copolymer (C) may be included in the domains of the ASA graft copolymer. In comparison with a copolymer of an aromatic vinyl monomer and a vinyl cyanide monomer having no alkyl(meth)acrylate compound, the random copolymer (C) includes about 50 to about 89% by weight of the alkyl(meth)acrylate compound and thus the difference of the refractive index between the ASA graft copolymer and the random copolymer (C) can be significantly decreased. When the random copolymer (C) is used together with (D) a copolymer of an aromatic methacrylate and a mono-functional unsaturated monomer, the compatibility between the polycarbonate and other components may be improved in the resulting resin composition, and at the same time, the difference of the refractive index in the domains including the ASA graft copolymer may be minimized. As a result, it can become possible for the resulting resin composition to have greatly enhanced coloring properties with minimal or no negative influences on other properties such as heat resistance, flowability, mechanical strength, and the like.

The thermoplastic resin composition may include the random copolymer (C) including the alkyl(meth)acrylate compound, the aromatic vinyl compound, and the vinyl cyanide compound in an amount of about 9 to about 29% by weight, for example about 10 to about 20% by weight, based on the total weight of the thermoplastic resin composition. In some embodiments, the thermoplastic resin composition may include the random copolymer (C) including the alkyl (meth)acrylate compound, the aromatic vinyl compound, and the vinyl cyanide compound in an amount of about 9, 10, 11, 12, 13, 14, 15, 16, 17, 18, 19, 20, 21, 22, 23, 24, 25, 26, 27, 28, or 29% by weight. Further, according to some embodiments of the present invention, the amount of the random copolymer (C) can be in a range from about any of the foregoing amounts to about any other of the foregoing amounts.

(D) Copolymers Including an Aromatic Methacrylate and a Mono-Functional Unsaturated Monomer The thermoplastic resin composition includes (D) a copolymer including an aromatic methacrylate and a mono-functional unsaturated monomer. The copolymer (D) of the aromatic methacrylate and the mono-functional unsaturated monomer may include a copolymer of an aromatic methacrylate represented by Chemical Formula 1 and a mono-functional unsaturated monomer or a mixture thereof:

[Chemical Formula 1]

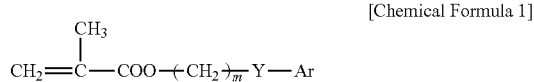

wherein m is an integer of 0 to 10, Y is a single bond, —O—, or —S—, and Ar is phenyl, methyl phenyl, methyl ethyl phenyl, propyl phenyl, methoxy phenyl, cyclohexyl phenyl, chloro phenyl, bromo phenyl, phenyl phenyl, or benzyl phenyl.

Examples of the aromatic methacrylate may include without limitation phenoxy methacrylate, 2-ethylphenoxy methacrylate, benzyl methacrylate, phenyl methacrylate, 2-ethylthiophenyl methacrylate, 2-phenylethyl methacrylate, 3-phenyl propyl methacrylate, 4-phenylbutyl methacrylate, and the like, and combinations thereof.

Examples of the mono-functional unsaturated monomer may include without limitation (meth)acrylic acid esters, unsaturated carboxylic acids, acid anhydrides, hydroxyl group-containing esters, (meth)acrylamide monomers, and the like, and combinations thereof. Specific examples of the monofunctional unsaturated monomer may include, but are not limited to, methacrylic acid esters such as methyl methacrylate, ethyl methacrylate, propyl methacrylate, butyl methacrylate, and benzyl methacrylate; acrylic acid esters such as methyl acrylate, ethyl acrylate, propyl acrylate, butyl acrylate, and 2-ethyl hexyl acrylate; unsaturated carboxylic acids such as acrylic acid and methacrylic acid; acid anhydrides such as maleic anhydride; hydroxyl group containing esters such as 2-hydroxyethyl acrylate, 2-hydroxypropyl acrylate, and monoglycerol acrylate; and (meth)acrylamides such as acrylamide and methacrylamide.

The copolymer (D) including the aromatic methacrylate and the mono-functional unsaturated monomer may be prepared by co-polymerizing about 20 to about 60% by weight, for example about 20 to about 40% by weight, of the aromatic methacrylate, and about 40 to about 80% by weight, for example about 60 to about 80% by weight, of the mono-functional unsaturated monomer based on the total weight of the copolymer (D). The copolymer may be polymerized via bulk polymerization, emulsion polymerization, and suspension polymerization as known in the art.

In some embodiments, the copolymer (D) may include the aromatic methacrylate in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the amount of the aromatic methacrylate can be in a range from about any of the foregoing amounts to about any other of the foregoing amounts.

In some embodiments, the copolymer (D) may include the mono-functional unsaturated monomer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the mono-functional unsaturated monomer can be in a range from about any of the foregoing amounts to about any other of the foregoing amounts.

The copolymer (D) of the aromatic methacrylate and the mono-functional unsaturated monomer may act as a compatibilizer that can facilitate the uniform mixing of the polycarbonate and other components (e.g., the ASA graft copolymer and the like) in the thermoplastic resin compositions. In this context, the copolymer (D) of the aromatic methacrylate and the mono-functional unsaturated monomer may have a weight average molecular weight of about 3,000 to about 30,000 g/mol, for example about 5,000 to about 20,000 g/mol, and as another example about 8,000 to about 15,000 g/mol.

The thermoplastic resin composition includes the copolymer (D) including the aromatic methacrylate and the mono-functional unsaturated monomer (as the compatibilizer) together with the random copolymer (C) including the alkyl(meth)acrylate compound, the aromatic vinyl compound, and the vinyl cyanide compound so that the difference in the refractive index between the components can be reduced and the compatibility therebetween may be enhanced. Therefore, the resin composition may provide a molded product having significantly enhanced coloring properties with minimal or no loss of thermal properties such as heat resistance and mechanical strength such as impact resistance.

The thermoplastic resin composition may include the copolymer (D) including the aromatic methacrylate and the mono-functional unsaturated monomer in an amount of greater than or equal to about 0.1% by weight and less than about 10% by weight, for example about 0.1 to about 5% by weight, based on the total weight of the resin composition. In some embodiments, the thermoplastic resin composition may include the copolymer (D) including the aromatic methacrylate and the mono-functional unsaturated monomer in an amount of about 0.1, 0.2, 0.3, 0.4, 0.5, 0.6, 0.7, 0.8, 0.9, 1, 2, 3, 4, 5, 6, 7, 8, or 9% by weight. Further, according to some embodiments of the present invention, the amount of the copolymer (D) can be in a range from about any of the foregoing amounts to about any other of the foregoing amounts.

The sum of the amounts of the random copolymer (C) of the alkyl(meth)acrylate compound, the aromatic vinyl compound, and the vinyl cyanide compound and the copolymer (D) of the aromatic methacrylate and the mono-functional unsaturated monomer may be less than about 30% by weight, for example about 25% by weight, based on the total weight of the resin composition. Within such a range, the resulting resin composition may prepare a molded product having greatly improved coloring properties with minimal or no loss in heat resistance, mechanical properties, and the like.

In addition to the components (A) to (D), the thermoplastic resin composition may further include at least one other additive for the purpose of improving injection moldability and achieving better balance among the properties as necessary for its final use. Examples of the additive may include, but are not limited to, a flame retardant, a surfactant, a nucleating agent, a coupling agent, a filler, a plasticizer, an impact reinforcing agent, a lubricant, an antibacterial agent, a release agent, a heat stabilizer, an antioxidant, a light stabilizer, an inorganic additive, a coloring agent, a stabilizer, a lubricating agent, an antistatic agent, a dye, a pigment, a flame proofing agent, and the like. The additive may be used alone or in a combination of two or more additives. The additive may be used in an appropriate amount such that it does not have an adverse effect on the properties of the thermoplastic resin composition. For example, the additive may be included in an amount of less than or equal to about 20 parts by weight based on about 100 parts by weight of the resin composition of components (A) to (D), but it is not limited thereto.

According to another embodiment, a molded product including the aforementioned thermoplastic resin composition is provided. The molded product may be produced in any known various methods such as injection molding, extrusion molding, and the like.

Not only can the molded product have excellent mechanical properties and excellent heat resistance, but it also can possess good weatherability and highly enhanced coloring properties. Therefore, the molded product may be advantageously used in materials for various electronic and electric parts intended for outdoor uses, building materials, sports equipment, parts for vehicles, and the like. By way of non-limiting examples, the molded product may be used in satellite antennas, kayak paddles, sash joiners and profiles, door panels, radiator grills for vehicles, side mirror housings, and the like, but it is not limited thereto.

EXAMPLES

The following examples illustrate this disclosure in more detail, however it is understood that this disclosure is not limited by these examples.

Examples 1 to 3

Each component as set forth in Table 1 is melted and kneaded in an amount recited in Table 1, and is extruded to prepare a composition in the form of pellets. The extrusion is conducted using a twin screw extruder having L/D of 29 and a diameter of 45 mm. The barrel temperature is 230° C.

Comparative Examples 1 to 7

A resin composition is produced in the form of pellets in the same manner as set forth in Example 1, except for using the components and the polymers as recited in Table 1.

TABLE 1

(unit: % by weight)

|  | Examples | | | Comparative Examples | | | | | | |
| --- | --- | --- | --- | --- | --- | --- | --- | --- | --- | --- |
|  | 1 | 2 | 3 | 1 | 2 | 3 | 4 | 5 | 6 | 7 |
| polycarbonate resin (A-1) | 40 | 40 | 40 | 40 | 40 | 40 | 40 | 40 | 40 | 40 |
| polycarbonate resin (A-2) | 15 | 15 | 15 | 15 | 15 | 15 | 15 | 15 | 15 | 35 |
| ASA graft copolymer (B) | 25 | 25 | 25 | 25 | 25 | 25 | 25 | 25 | 25 | 25 |
| Styrene-acrylonitrile copolymer (C-1) | — | — | — | 20 | — | — | — | — | — | — |
| Styrene-acrylonitrile copolymer (C-2) | — | — | — | — | 20 | — | — | — | — | — |
| Methylmethacrylate-styrene-acrylonitrile copolymer (C-3) | 19 | 17 | 15 | — | — | 20 | 10 | — | — | — |
| Phenyl methacrylate-methylmethacrylate copolymer(D-1) | 1 | 3 | 5 | — | — | — | 10 | 20 | — | — |
| polymethylmethacrylate (D-2) | — | — | — | — | — | — | — | — | 20 | — |

(A-1) polycarbonate resin (Cheil Industries Inc.): weight average molecular weight about 20,000 g/mol
(A-2) polycarbonate resin (Cheil Industries Inc.): weight average molecular weight about 24,000 g/mol
(B) ASA graft copolymer (Cheil Industries Inc.): a copolymer of a double core-shell type prepared by graft-polymerizing 50 parts by weight of a monomer mixture consisting of 33% by weight of acrylonitrile and 67% by weight of styrene with 50 parts by weight of a butyl acrylate rubber polymer of a double core structure consisting of an inner core of a copolymer of butyl acrylate and styrene and an outer core of butyl acrylate
(C-1) styrene-acrylonitrile copolymer (Cheil Industries Inc.): acrylonitrile 24% by weight, styrene 76% by weight, weight average molecular weight about 100,000 g/mol
(C-2) styrene-acrylonitrile copolymer (Cheil Industries Inc.): acrylonitrile 40% by weight, styrene 60% by weight, weight average molecular weight about 100,000 g/mol
(C-3) methyl methacrylate-styrene-acrylonitrile copolymer (Cheil Industries Inc.): acrylonitrile 5% by weight, styrene 20% by weight, methyl methacrylate 75% by weight, weight average molecular weight about 100,000 g/mol
(D-1) phenyl methacrylate-methyl methacrylate copolymer (Cheil Industries Inc.): phenyl methacrylate 30% by weight, methyl methacrylate 70% by weight, weight average molecular weight about 13,000 g/mol
(D-2) polymethyl methacrylate (Cheil Industries Inc.): weight average molecular weight about 90,000 g/mol Tests For Properties The pellets prepared in accordance with Examples 1 to 3 and Comparative Examples 1 to 7 are dried at 80° C. for 6 hours and prepared as a test piece using a 6 oz injection molding machine at a cylinder temperature of 240° C. and a mold temperature 60° C. For each of the test pieces, impact strength, color, and L value are measured and the flow index of dried pellets is measured in accordance with the following manners. The results are compiled in Table 2.

(1) Impact Strength

The notched Izod impact strength is measured for a ⅛" specimen in accordance with ASTM D 256A.

(2) Flow Index (MI, Melt Flow Index)

Flow index is measured using dried pellets at a temperature of 250° C. under a 10 kg load in accordance with ISO 1133.

(3) Colors

For a test piece of L 90 mm×W 50 mm×T 2.0 mm, a dark black color impression is measured by the naked eye in accordance with the following standards: ◎=excellent, °=good, Δ=normal, X=poor, XX=very poor (4) L Value For a test piece of L 90 mm×W 50 mm×T 2.0 mm, the L value is measured using a CM-3600D spectrophotometer (from Konica Minolta Inc.) in accordance with the SCI (specular component included) standard. Higher L values mean higher brightness, brighter colors, and lower coloring properties.

TABLE 2

| Properties | Examples | | | Comparative Examples | | | | | | |
|---|---|---|---|---|---|---|---|---|---|---|
| | 1 | 2 | 3 | 1 | 2 | 3 | 4 | 5 | 6 | 7 |
| Impact strength (kgf · cm/cm) | 58 | 57 | 55 | 60 | 55 | 58 | 30 | 10 | 30 | 65 |
| Flow Index (g/10 min) | 35 | 40 | 42 | 28 | 26 | 30 | 44 | 50 | 15 | 5 |
| Colors | ○ | ◎ | ◎ | X | X | ○ | ◎ | X | X | XX |
| L value | 28.1 | 27.8 | 27.5 | 31.2 | 30.4 | 29.6 | 27.5 | 29.2 | 30.6 | 32.4 |

The results of Table 1 and Table 2 confirm that the pellets and test pieces prepared from the resin compositions of Examples 1 to 3 have excellent impact strength and flow index and achieve significant improvements in the colors and the L values, indicating that they have excellent coloring properties.

In contrast, the coloring properties (the colors and the L values) are significantly poor and/or the impact strength or the flow index are greatly reduced in case of the comparative examples, wherein the styrene-acrylonitrile copolymer of (C-1) or (C-2) is used instead of the copolymer of methyl methacrylate-styrene-acrylonitrile (C-3) (see Comparative Examples 1 and 2), wherein the copolymer (C-3) is used but the copolymer of phenyl methacrylate-methyl methacrylate (D-1) is not used (see Comparative Example 3), wherein an excess amount of the copolymer (D-1) is used (see Comparative Example 4), or wherein the copolymer (D-1) is used but the copolymer (C-3) is not used (see Comparative Example 5). In addition, when polymethylmethacrylate is used instead of a copolymer of phenylmethacrylate-methylmethacrylate, the impact strength, the flow index, and the coloring properties (the color and the L value) are greatly worsened.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A thermoplastic resin composition, comprising:
(A) about 40 to about 70% by weight of a polycarbonate resin; (B) about 20 to about 40% by weight of an acrylate-styrene-acrylonitrile (ASA) graft copolymer having a shell containing 50 to about 80% by weight styrene and about 20 to 50% by weight acrylonitrile based on the total weight of the shell; (C) about 9 to about 29% by weight of a random copolymer of an alkyl(meth)acrylate, an aromatic vinyl compound, and a vinyl cyanide compound; and (D) greater than or equal to about 0.1% by weight and less than or equal to about 5% by weight of a copolymer of an aromatic methacrylate and a monofunctional unsaturated monomer, each based on the total weight of the thermoplastic resin composition,
wherein the amount of the alkyl(meth)acrylate compound in the random copolymer (C) of an alkyl(meth)acrylate, an aromatic vinyl compound, and a vinyl cyanide compound ranges from about 50% by weight to about 89% by weight based on the total weight of the random copolymer (C) of an alkyl(meth)acrylate, an aromatic vinyl compound, and a vinyl cyanide compound,
wherein the copolymer (D) of an aromatic methacrylate and a monofunctional unsaturated monomer includes a copolymer of an aromatic methacrylate represented by Chemical Formula 1 and a monofunctional unsaturated monomer:

[Chemical Formula 1]

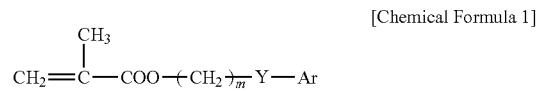

wherein m is an integer of 0 to 10, Y is a single bond, —O—, or —S—, and Ar is phenyl, methyl phenyl, methyl ethyl phenyl, propyl phenyl, methoxy phenyl, cyclohexyl phenyl, chloro phenyl, bromo phenyl, phenyl phenyl, or benzyl phenyl, with the proviso that when m is 0 or 1 then Y is a single bond
wherein the monofunctional unsaturated monomer in the copolymer (D) comprises a (meth)acrylic acid ester, and
wherein the copolymer (D) of an aromatic methacrylate represented by Chemical Formula 1 and the monofunctional unsaturated monomer has a weight average molecular weight of about 8,000 g/mol to about 15,000 g/mol.

2. The thermoplastic resin composition of claim 1, wherein a sum of the amounts of (C) the random copolymer of an alkyl(meth)acrylate, an aromatic vinyl compound, and a vinyl cyanide compound and (D) the copolymer of an aromatic methacrylate and a monofunctional unsaturated monomer is less than about 30% by weight based on the total weight of the composition.

3. The thermoplastic resin composition of claim 1, wherein in the random copolymer (C), the alkyl(meth) acrylate compound comprises methyl acrylate, ethyl acrylate, methyl methacrylate, ethyl methacrylate, or a combination thereof, the aromatic vinyl compound comprises styrene, α-methylstyrene, p-methylstyrene, or a combination thereof, and the vinyl cyanide compound comprises acrylonitrile, methacrylonitrile, or a combination thereof.

4. The thermoplastic resin composition of claim 1, wherein the copolymer (D) of the aromatic methacrylate and the monofunctional unsaturated monomer is a copolymer of about 20 to about 60% by weight of the aromatic methacrylate represented by Chemical Formula 1 and about 40 to about 80% by weight of the monofunctional unsaturated monomer based on the total weight of the copolymer (D).

5. The thermoplastic resin composition of claim 1, wherein the monofunctional unsaturated monomer in the copolymer (D) further comprise an unsaturated carboxylic acid, a hydroxyl group containing ester, a (meth)acryl amide, or a combination thereof.

6. A molded product prepared from the thermoplastic resin composition of claim 1.

7. The thermoplastic resin composition of claim 1, wherein the copolymer (D) of an aromatic methacrylate and a monofunctional unsaturated monomer is a copolymer of the aromatic methacrylate represented by Chemical Formula 1 and a (meth)acrylic acid C1-C4 alkyl ester.

8. The thermoplastic resin composition of claim 1, wherein the copolymer (D) of an aromatic methacrylate and a monofunctional unsaturated monomer includes a copolymer consisting of an aromatic methacrylate represented by Chemical Formula 1 and a (meth)acrylic acid ester.

* * * * *